United States Patent [19]

Sakagami et al.

[11] Patent Number: 5,727,234
[45] Date of Patent: Mar. 10, 1998

[54] CAMERA WITH SHAKE DETECTION AND DISPLAY

[75] Inventors: Yasushi Sakagami, Tokyo; Yoshio Matsuzawa, Kanagawa-ken, both of Japan

[73] Assignee: Nikon Corporation, Tokyo, Japan

[21] Appl. No.: 409,065

[22] Filed: Mar. 23, 1995

[30] Foreign Application Priority Data

Apr. 4, 1994 [JP] Japan ................................. 6-066138

[51] Int. Cl.[6] ........................... G03B 13/00; G03B 13/18
[52] U.S. Cl. ........................ 396/52; 396/291; 396/292
[58] Field of Search ............................ 354/400–409, 354/76, 70, 202, 430, 266, 267.1; 348/208; 396/147, 148, 287–292

[56] References Cited

U.S. PATENT DOCUMENTS

| | | | |
|---|---|---|---|
| 5,237,365 | 8/1993 | Miyazawa | 354/456 |
| 5,239,337 | 8/1993 | Takagi et al. | 354/443 |
| 5,266,981 | 11/1993 | Hamada et al. | 354/400 |
| 5,335,032 | 8/1994 | Onuki et al. | 354/195.1 |
| 5,361,119 | 11/1994 | Shida et al. | 354/409 |
| 5,461,453 | 10/1995 | Watanabe et al. | 354/471 |
| 5,485,241 | 1/1996 | Irie et al. | 354/410 |

FOREIGN PATENT DOCUMENTS

| | | |
|---|---|---|
| 1-123219 | 5/1989 | Japan . |
| 2-126261 | 5/1990 | Japan . |
| 5-289139 | 11/1993 | Japan . |

*Primary Examiner*—Howard B. Blankenship
*Assistant Examiner*—Eric Nelson
*Attorney, Agent, or Firm*—Oliff & Berridge, PLC

[57] ABSTRACT

A camera is provided that accomplishes a warning display using a range measurement frame indicating a specific subject field region. The camera includes a shake amount detection system that detects the amount of shaking of the camera, a drive system that drives the correction lens to effect shake correction and a movement amount detection system that detects the amount of movement of the correction lens. The camera may also include a lens MPU and a camera MPU. The lens MPU determines whether or not shaking has been negated through driving of the correction lens accomplished by the drive system. When shaking has not been negated, the lens MPU outputs a warning signal. The camera MPU sends a signal to the warning display system upon receiving this output warning signal to cause a range measurement frame to flash.

19 Claims, 11 Drawing Sheets

CAMERA WITH SHAKE DETECTION AND DISPLAY

BACKGROUND OF THE INVENTION

1. Field of the Invention

The present invention relates to a camera which detects a change in the state of the camera during photography and accomplishes a predetermined warning output.

2. Description of Related Art

Conventional cameras are known that detect the state of the camera during photography and conduct a predetermined warning output using a viewfinder configuration similar to that shown in FIG. 16.

In FIG. 16, a range measurement frame 84c is displayed in the viewfinder field 81 within the viewfinder region 80. A display indicator region 83 that displays various information about the camera state is provided in the region 82 outside the viewfinder field 81.

The conventional camera is configured with the warning display in the display region 83. The photographer can determine the absence or presence of a warning by viewing the display region 83 outside the viewfinder field 81.

However, the photographer is concentrating on the photographic subject while determining the composition of the photograph, both during the picture taking and immediately following the picture taking.

Accordingly, an extra action is required by the photographer to move the visual line from the subject to the display indicator region 83 outside the viewfinder field 81 to determine the absence or presence of a warning. There is also the possibility the warning display will be overlooked because the photographer is paying attention to the subject. Further, a camera may be equipped with a plurality of focus state detection regions. Then, the photographer's eyes will concentrate on the range measurement frame that must be selected from among the plurality of range measurement frames corresponding to the possible focus state detection regions.

Additional cameras display a large amount of information within the viewfinder, such as warnings. This increase in the number of display regions increases the complexity of the viewfinder region 80.

In addition, display elements used for displaying information other than warnings can also be used for warning displays. However, at the time of the warning, the display element cannot be used for displaying any information other than the warning. Accordingly, there are limits on display elements used as both.

Prior art cameras are known that detect movement of the camera during photography and provide a warning output to the photographer. For example, the "camera shake display device" in Japanese unexamined patent publication Hei 2-126251 discloses one such camera. In this camera shake display device, although the warning display is an LED bar display, such a warning display is positioned outside the viewfinder field. This is because shielding members, such as non-light-emitting units and support members, are placed around the light-emitting unit of the LED. The subject is therefore obstructed because the LED bar display is positioned within the viewfinder field 81.

In the "camera with shake display function" disclosed in Japanese unexamined patent publication Hei 1-123219, although the shake trace is displayed within the viewfinder field, there is no warning display relating to this shaking.

Other conventional cameras address these problems by detecting and then correcting for the camera shaking. When the camera shaking is large, shake correction cannot be accomplished even in cameras that correct for shaking. Accordingly, the photographer must still be warned when shake correction has not been accomplished.

Cameras that conduct a warning display when shake correction cannot be accomplished include, for example, the "shake display device" disclosed in Japanese unexamined patent publication Hei 5-289139. With this "shake display device", no particular mention is made of the output state of the warning output when shake correction cannot be accomplished. However, any effects would be further enhanced if a warning display was accomplished within the viewfinder field.

SUMMARY OF THE INVENTION

It is an object to provide a camera having a warning display using a range measurement frame within the viewfinder field.

It is a further object to provide a camera that detects and corrects camera shaking and having a warning display within the viewfinder field when correction of the shaking cannot be accomplished.

In one embodiment of the present invention a warning display device changes the range measurement frame to a predetermined display state when a predetermined warning signal is received.

In another embodiment, the warning display device changes the display state after exposure of the photographic film has been completed.

In yet another embodiment, the warning display device displays a warning within the viewfinder field after exposure of the photographic film has been completed and when the amount of shaking detected by a shake amount detection device exceeds a preset shake amount.

In still yet another embodiment, the warning display device displays a warning within the viewfinder field after exposure of the photographic film has been completed and when the correction error exceeds a preset amount.

The warning display device may change the range measurement frame to a predetermined display state in the warning display. Additionally, the warning display device may change the range measurement frame selected by the selection device to a predetermined display state.

Still further, the warning display device may cause the range measurement frame to flash or change the display color of the range measurement frame.

Even still further, a visual line detection device may detect the point of convergence of the eyes of the photographer within the viewfinder field. The selection device selects the focus state detection region corresponding to the point of convergence detected by the visual line detection device and the warning display device then displays a warning within the selected focus state detection region.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
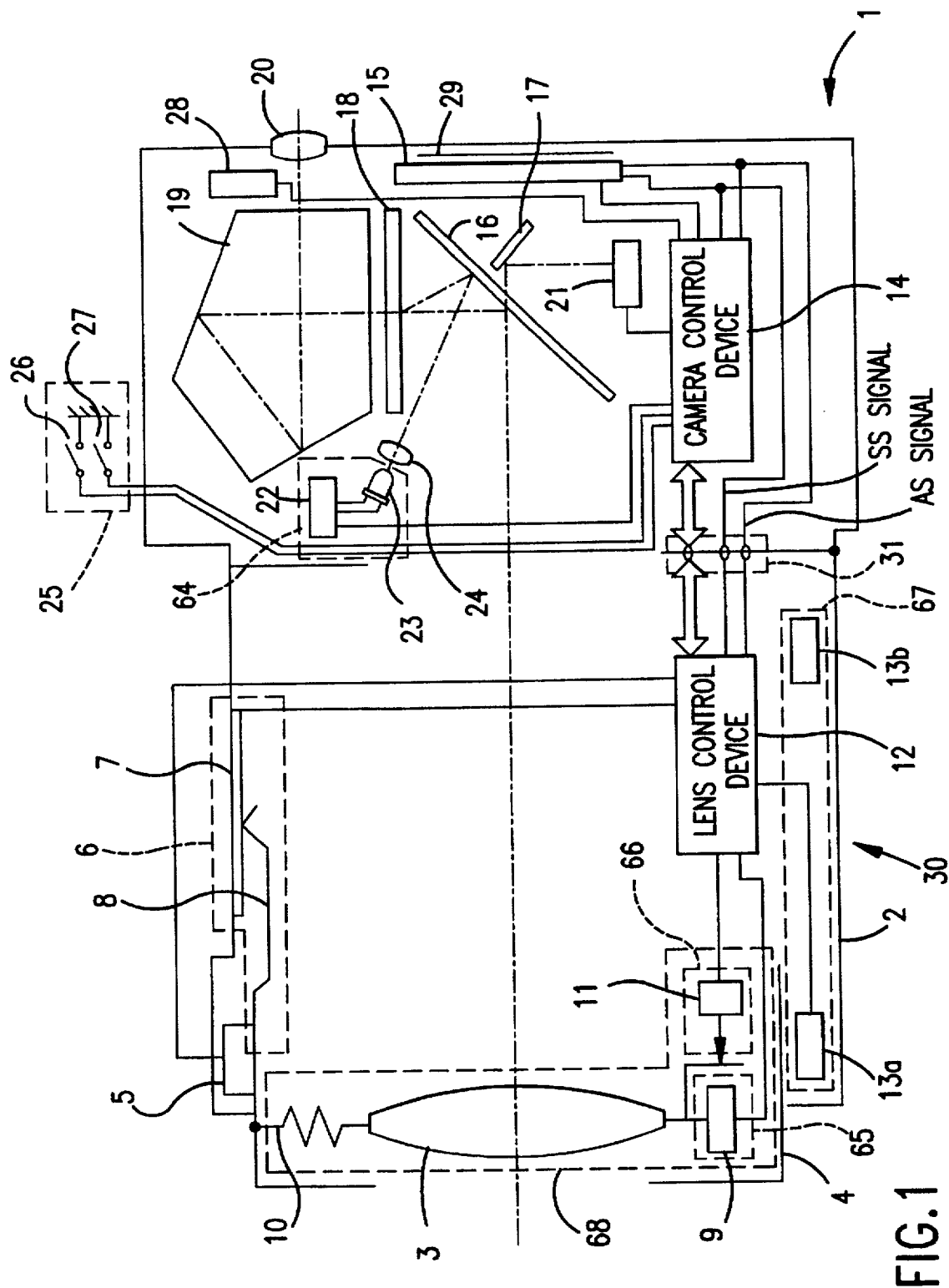
FIG. 1 is a drawing showing a camera according to one embodiment of the present invention.

FIG. 1 shows a camera according to a first embodiment. The camera includes a camera body 1 and a shooting lens 30. The shooting lens 30 is preferably provided interchangeably on the camera body 1. Electrical connections 31 are provided in both the camera body 1 and the shooting lens 30 so that signals can be mutually sent and received. The shooting lens 30 is equipped with a lens inner barrel 4 provided with a lens group (only the correction lens 3 is shown in FIG. 1) including the photography optical system and a lens barrel 2. The lens inner barrel 4 scrolls in and out as it is supported by the lens barrel 2.

Inside the shooting lens 30 a shake amount detection system 67 that detects the amount of shaking of the optical axis of the photography optical system. A shake correction system 68 causes the photography optical system to move based on detection results of the shake amount detection system 67. A lens driving unit 5 moves part of the lens group to effect focussing. A scrolling amount detection unit 6 detects the amount of scrolling of the lens inner barrel 4 during the focussing action. A lens control device 12 is additionally provided. After receiving and processing signals from the shake amount detection system 67 and the scrolling amount detection unit 6, the lens control device 12 outputs signals to the shake correction system 68 and the lens driving unit 5. In addition, the lens control device 12 sends signals to and receives signals from the camera body 1 through the electrical connections 31.

The shake amount detection system 67 can include an acceleration sensor, an angular velocity sensor, a CCD (charge-coupled device) or the like. The amount of displacement can be found by integrating twice for the acceleration sensor and by integrating once for the angular velocity sensor. When a CCD is used, the amount of shaking in the photography optical system can be directly output. The first embodiment includes acceleration sensors 13a and 13b and two acceleration sensors 13c and 13d (not shown in FIG. 1) centered on the optical axis and positioned at 90 degree angles from acceleration sensors 13a and 13b. From the detection results of the sensors 13a, b, c and d, the vibration of the shooting lens 30 in the pitch direction and in the yaw direction is computed.

The shake correction system 68 includes a convex correction lens 3, a suspension spring 10, a driving system 65, and a movement amount detection system 66. The convex correction lens 3 changes the optical path of the photography optical system. The suspension spring 10 applies exertion to the correction lens 3. The driving system 65 moves the correction lens 3 and the movement amount detection system 66 detects the amount of movement of the correction lens 3. The suspension spring 10 diminishes the mechanical backlash during movement of the correction lens 3.

The drive system 65 includes a shake correction drive device 9 that moves the correction lens 3 in a plane perpendicular to the optical axis. In FIG. 1, only one shake correction drive device 9 is shown, but a similar device is also positioned in a nearly perpendicular direction. These two shake correction drive devices are configured for independent driving, thereby correcting the shaking of the shooting lens 30 in the pitch direction and the yaw direction. The drive system 65 can also include a shake correction drive device that vibrates the correction lens 3 about a predetermined point on the optical axis.

The movement amount detection system 66 may include a correction lens movement amount detection device 11 that detects the amount of movement of the correction lens 3 by detecting the amount of movement of one part of the member that supports the correction lens 3 as shown in FIG. 1. A drive device equipped with a motor and a gear array for transferring drive power from the motor to the correction lens 3 can be used as the shake correction drive device 9. A photo-interrupter then detects the number of motor rotations and the amount of movement of the correction lens 3 is computed from the motor rotation detection results. In this configuration, the amount of movement is easily detected with good precision.

The shake correction system 68 may also include a variable apex angle prism in addition to the convex correction lens 3. A variable apex angle prism is preferably filled with a liquid. Shake correction is then performed by changing the apex angle of the prism through movement of the liquid.

The scrolling amount detection unit 6 includes a linear encoder 7 inside the lens barrel 2, and a linear encoder brush 8 on the lens inner barrel 4 that rubs against the linear encoder 7. The linear encoder 7 detects the relative displacement of the linear encoder brush 8. Through the detection results, the amount of scrolling of the lens inner barrel 4 with respect to the lens barrel 2 is detected.

The camera body 1 may also include a quick return mirror 16, an auxiliary mirror 17, a focus state detection unit 21, a viewfinder screen 18, a pentagonal prism 19, an eyepiece lens 20, a photometry unit 28, a warning display system 64, a condenser lens 24, a shutter mechanism unit 15, photographic film 29, a release button 25 and a camera control device 14.

The quick return mirror 16 preferably is semi-transparent. FIG. 1 shows the mirror as positioned when the subject is being observed. Accordingly, light from the subject that has passed through the shooting lens 30 is reflected toward the pentagonal prism 19 by the quick return mirror 16. However, part of this light passes through the quick return mirror 16 and is reflected by an auxiliary mirror 17 behind the quick return mirror 16.

Light rays reflected by the auxiliary mirror 17 are sent to the focus state detection unit 21. During exposure of the photographic film 29, the quick return mirror 16 withdraws away from the photography optical path and then returns again to the position shown in FIG. 1 after the exposure.

While the majority of the light rays incident on the pentagonal prism 19 are deflected to the eyepiece lens 20, some of these light rays are incident on the photometry unit 28. The photometry unit 28 accomplishes photometry using these incident light rays.

In the first embodiment, the shutter mechanism unit 15 is a focal plane shutter. The focal plane shutter includes a front blind and a rear blind as is well known in the art. Furthermore, when the front blind begins to move at the start of film exposure, a signal (called an SS signal) is output. When the rear blind has finished moving at the completion of film exposure, a signal (called an AS signal) is output. These signals are conveyed to the camera control device 14 and the lens control device 12 through the electrical connections 31.

On the bottom surface of the viewfinder screen 18 a range measurement frame indicates the focus state detection region.

The warning display system 64 includes an LED 23 for illuminating the range measurement frame and a display control unit 22 to control the LED 23. In addition, a condenser lens 24 is provided in front of the LED 23 to condense the illuminating light from the LED 23. The illuminating light from the LED 23 passes through the condenser lens 24, is reflected by the quick return mirror 16, and illuminates the range measurement frame. The LED 23 and condenser lens 24 are positioned at a position corresponding to the range measurement frame. Furthermore, when a plurality of range measurement frames are on the viewfinder screen 18, a plurality of LED and condenser lens pairs are preferably positioned based on the number of range measurement frames.

Figure 9:
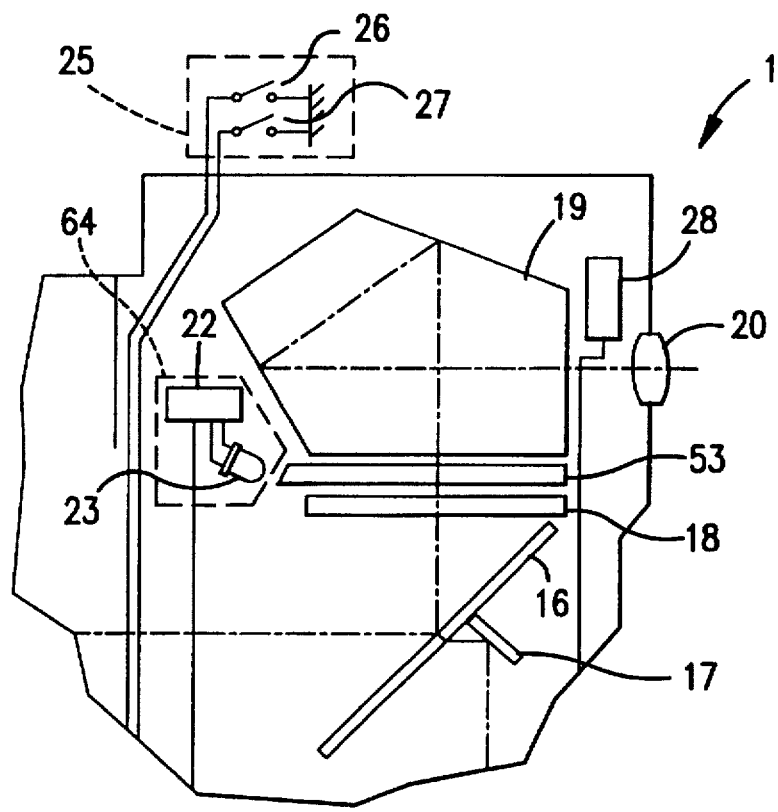
FIG. 9 is an enlargement of one embodiment.

FIG. 9 shows the range measurement frame. An illuminating light guide plate 53 is provided between the pentagonal prism 19 and the viewfinder screen 18. The illuminating light guide plate 53 is described hereafter with reference to FIGS. 10–12.

Figure 10:
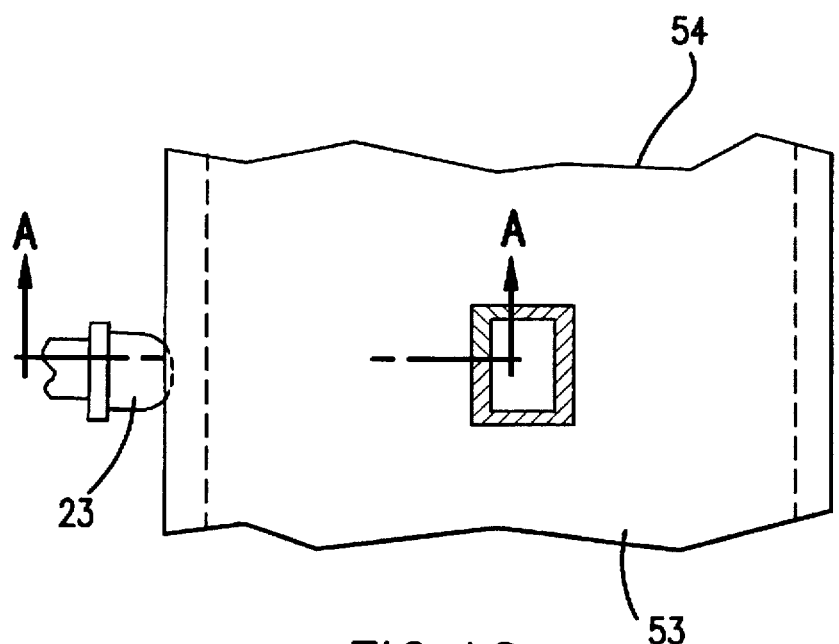
FIG. 10 is a top view showing an illuminating light guide plate.
Figure 11:
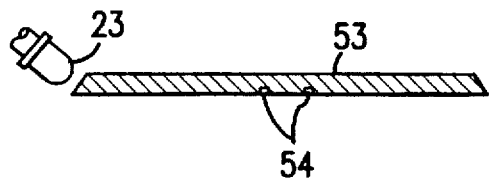
FIG. 11 is a drawing showing the illuminating light guide plate of FIG. 10.

The illuminating light guide plate 53 is made of transparent plastic such as acrylic or the like having a thickness of 1–2 mm. As shown in FIGS. 10 and 11, the LED 23 is positioned at a location facing the side surface of the illuminating light guide plate 53. The LED 23 infuses light into the inside of the illuminating light guide plate 53. The side surface of the illuminating light guide plate 53 facing the LED 23 is cut in an oblique direction with respect to the principal plane. Therefore, the light is infused into the inside of the illuminating light guide plate 53 in an oblique direction with respect to the principal plane.

Figure 12:
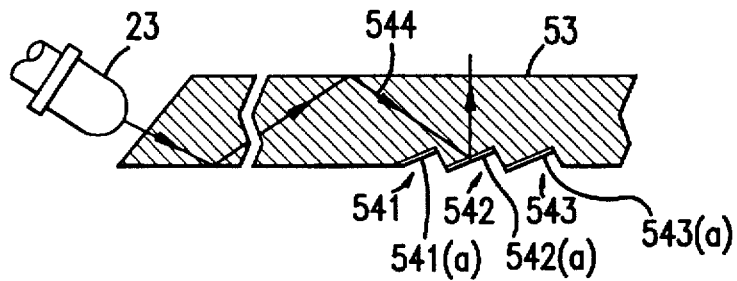
FIG. 12 is a cross-section taken along line A—A in FIG. 10.

As shown in FIGS. 10 and 11, a display frame 54 is formed in the illuminating light guide plate 53 at a position corresponding to the range measurement frame. An enlargement of the display frame 54 is shown in FIG. 12. Three V grooves 541, 542 and 543 are formed in the illuminating light guide plate 53 on the surface facing the quick return mirror 16. Reflective membranes 541a, 542a and 543a are formed on one side surface of each of these V grooves. These reflective membranes block a fixed amount of the light from the quick return mirror 16. Through the blocking of light by the reflective membranes, the photographer may distinguish between areas inside the range measurement frame and outside the range measurement frame while still observing the subject.

Part of the light 544 emitted by LED 23 and traveling inside the illuminating light guide plate 53 is reflected by reflective membrane 542a toward the pentagonal prism 19 as shown in FIG. 12. The photographer can therefore confirm lighting the range measurement frame. Different colored LEDs may also be desired.

As shown in FIG. 1, the release button 25 includes a half-depressed switch 26 where the connection is closed (the switch is on) when the release button 25 is depressed halfway, and a release switch 27 where the connection is closed (the switch is on) when the release button 25 is further depressed. A signal is output to the camera control device 14 when either the half-depressed switch 26 or the release switch 27 is on.

The focus state detection unit 21, the photometry unit 28, the warning display system 64, the shutter mechanism unit 15, the release button 25, and the electrical connections 31 are all connected to the camera control device 14 to send and receive signals between these components.

The camera control device 14 and the lens control device 12 are now described in further detail. Preferably both the camera control device 14 and the lens control device 12 are composed of an MPU including a computation unit, a control unit, a memory unit and a communication unit (not shown).

Figure 2:
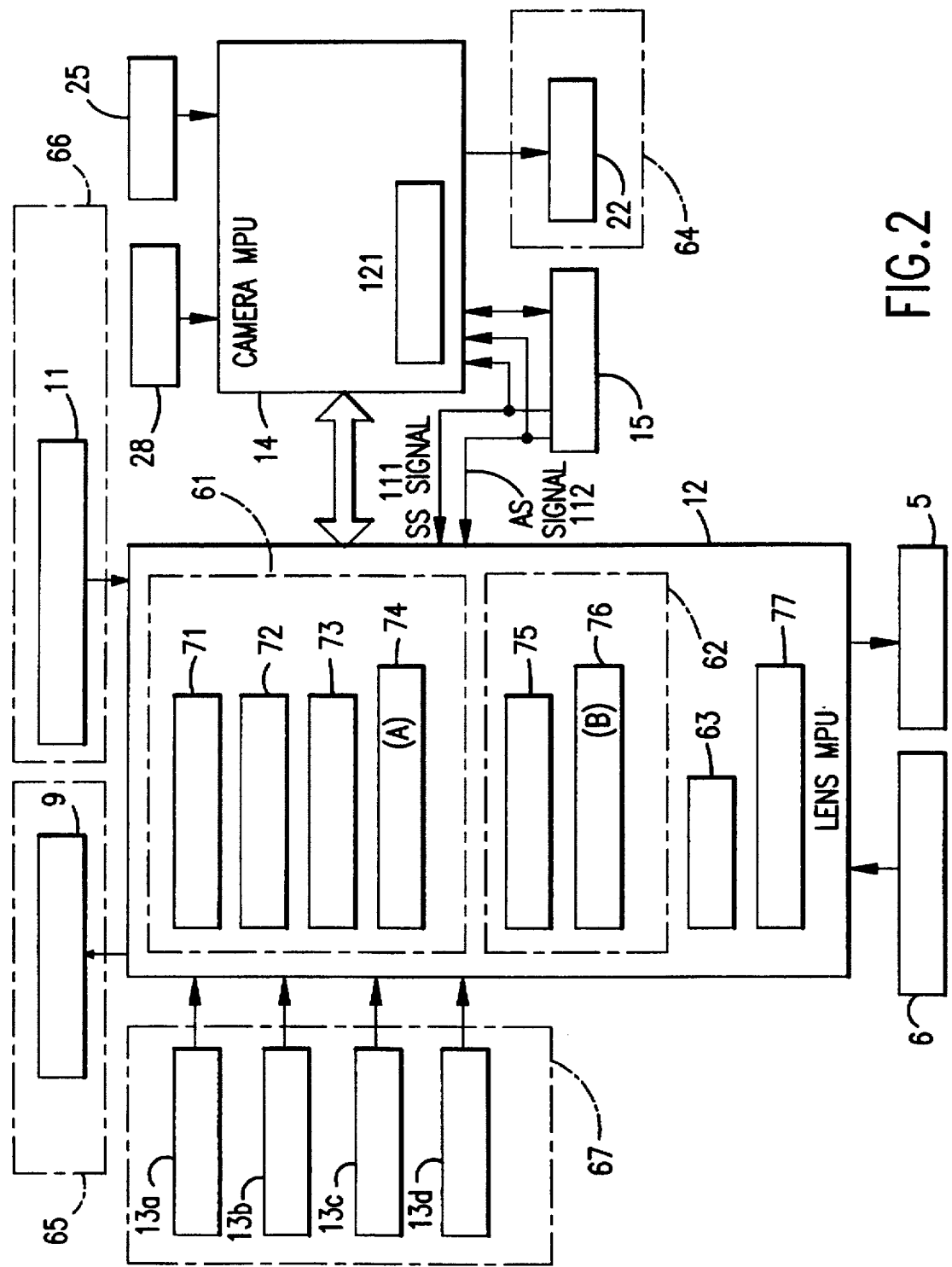
FIG. 2 is a block diagram showing a camera according to one embodiment of the present invention.

FIG. 2 shows the camera control device (camera MPU) 14, the lens control device (lens MPU) 12 and devices peripheral to each. Representative circuits are indicated by function in each of the MPUs. These circuits function upon the operation of the computation unit, the control unit and the communication unit based on programs stored in the memory unit. The camera MPU 14 and the lens MPU 12 have circuits other than those circuits shown in FIG. 2 to conduct camera operations. In addition, communication between both MPUs occurs through the electrical connections 31.

The lens MPU 12 is connected to the shake amount detection system 67, the drive system 65 (specifically, the shake correction drive device 9) that drives the correction lens 3 based on signals output from the lens MPU 12, the movement amount detection system 66 (specifically, the correction lens movement amount detection device 11) that detects the amount of movement of the correction lens 3, the scrolling amount detection unit 6 and the lens driving unit 5.

The lens MPU 12 may additionally include a correction control system 61 that accomplishes drive control of the correction lens 3 and a correction error computation system 62 that computes the correction error of the drive system 65. A determination circuit 63 may be provided in the lens MPU 12 to determine whether the described correction error exceeds a preset value. The MPU 12 may also include a lens data memory unit 77 that stores information including the focal length of the shooting lens 30.

The correction control system 61 includes a shake amount computation circuit 71 that computes the amount of shaking of the optical axis of the photography optical system based on a signal output from the shake amount detection system 67, a driving amount computation circuit 72 that computes the driving amount of the correction lens 3 based on the amount of shaking computed by the shake amount computation circuit 71 and a drive error computation circuit 73. The correction control system 61 may also include a drive error memory unit (A) 74 that stores the drive error computed by the drive error computation circuit 73 into memory. The drive error computation circuit 73 computes a drive error by comparing the driving amount output by the driving amount computation circuit 72 and the amount of movement of the correction lens 3 driven by the shake correction drive device 9 based on the driving amount.

The correction error computation system 62 includes a drive error memory unit (B) 76 that stores in maximum and minimum values of the drive error in memory, and a correction error computation circuit 75 that computes the correction error of the drive system 65 based on the maximum and minimum values of the drive error. Further description of the maximum and minimum values of the drive error is provided below.

The release button 25, the photometry unit 28, the warning display system 64, and the shutter mechanism unit 15 are connected to the camera MPU 14 that includes an exposure control circuit 121. The exposure control circuit 121 sends signals to and receives signals from the shutter mechanism unit 15. Specifically, the exposure control circuit 121 determines the shutter speed from subject field luminosity information obtained from the photometry unit 28 and film sensitivity information from the photographic film 29. The exposure control circuit 121 then controls the shutter mechanism unit 15 based on the shutter speed.

The exposure control circuit 121 sends signals to the shutter mechanism unit 15 including a front blind engagement stop release signal and a rear blind engagement stop release signal. The front blind engagement stop release signal starts movement of the front blind. The rear blind engagement stop release signal starts movement of the rear blind and is output a predetermined length of time after the front blind engagement stop release signal. Additional signals output from the shutter mechanism unit 15 include the SS signal indicating the opening of the front blind and the start of an exposure as well as the AS signal indicating the closing of the rear blind and the completion of an exposure.

The basic operations of the first embodiment during picture taking are now described with reference to FIGS. 1–5. Unless otherwise indicated, the processes described hereafter are executed by the computation unit, the control unit and the communication unit in the lens MPU based on programs stored in the memory unit. In addition, representative processes are described referring to each of the described circuits.

As described with respect to FIG. 2, when the power source switch is turned on, initializing of the lens MPU 12 starts in step S110 and the initial process of each camera component is executed.

Figure 4:
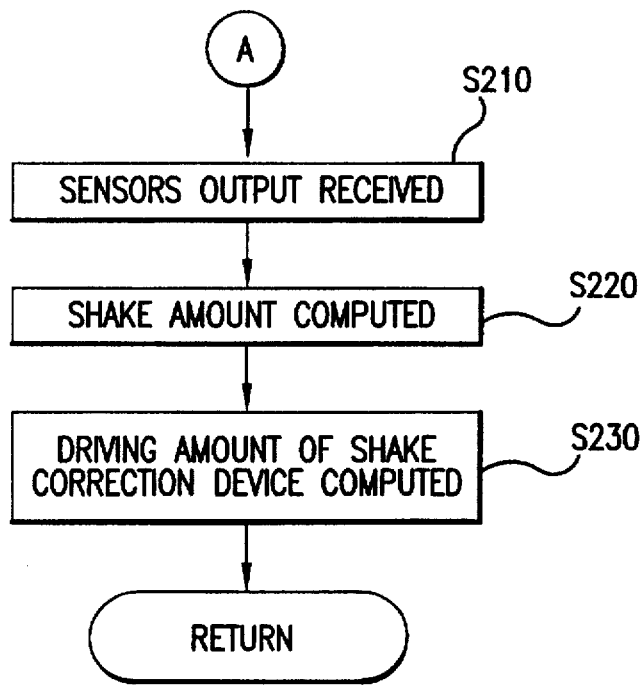
FIG. 4 is a flowchart describing subroutine A of FIG. 3.

In subroutine A, when a signal is received indicating the half-depressed switch 26 is on, the processes shown in FIG. 4 are executed.

As shown in FIG. 4, in step S210, the camera shake computation circuit 71 receives the focal length of the shooting lens from the lens data memory unit 77, signals output from the acceleration sensors 13a, 13b, 13c and 13d and signals output from the scrolling amount detection unit 6. The amount of shaking of the photography optical system is computed in step S220. Step 220 may be accomplished using the method disclosed in the third embodiment of Japanese unexamined patent publication Hei 5-297442. In step 230, the driving amount computation circuit 72 computes the driving amount to send to shake correction drive device 9 based on the amount of shaking detected.

Figure 5:
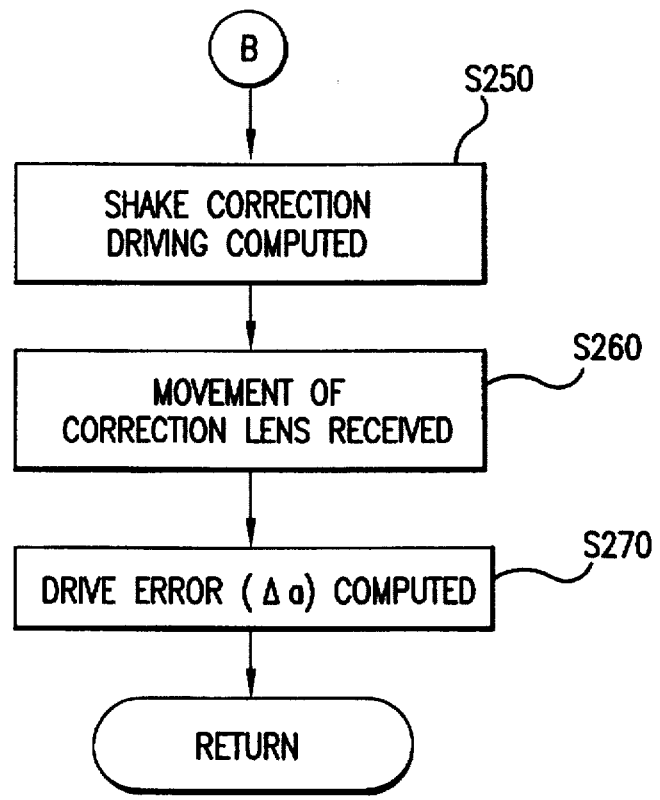
FIG. 5 is a flowchart describing subroutine B of FIG. 3.

Subroutine B will now be described with respect to FIG. 5. In step S250, the driving amount computation circuit 72 computes a new driving amount by adding the previous drive error (the method of computation is described in step S270) read from the drive error memory unit (A) 74 to the driving amount computed in step 230. This new driving amount is output to the shake correction drive device 9 as a signal. The shake correction drive device 9 causes the correction lens 3 to move based on the received signal.

In step S260, the drive error computation circuit 73 computes the amount of movement of the correction lens 3 by receiving a signal indicating the amount of movement of the correction lens 3 from the correction lens movement amount detection device 11.

In step S270, the drive error computation circuit 73 computes the drive error (▲a) by comparing the computed movement amount with the driving amount output by the driving amount computation circuit 72 in step S250. The drive error (▲a) is stored in the drive error memory unit (A) and is referenced as the previous drive error during the next driving amount computation in step S250. When subroutine B is executed the first time, a preset initial value for the drive error is referenced because no computed drive error exists.

Figure 3:
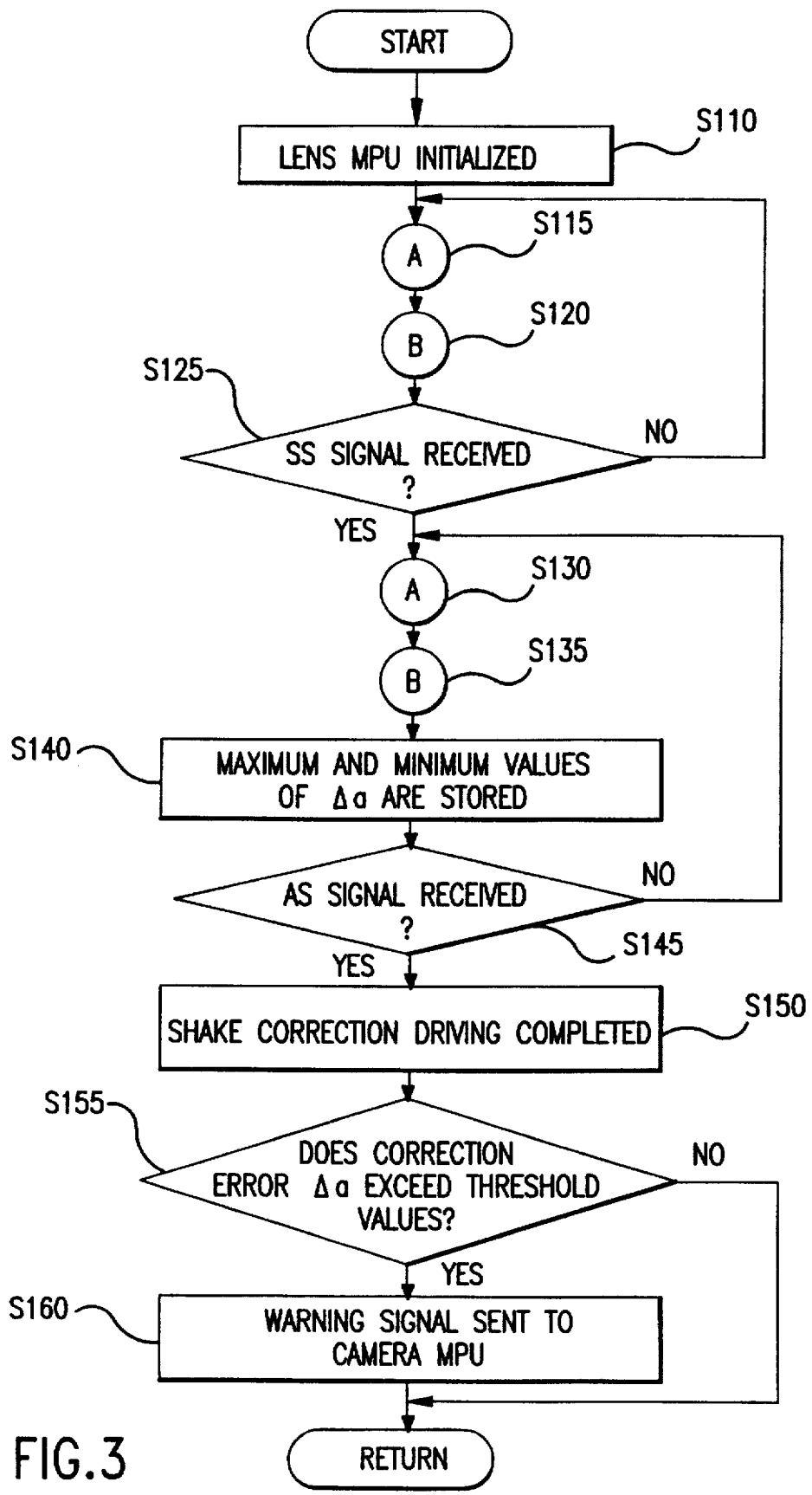
FIG. 3 is a flowchart explaining the operations of one embodiment of the present invention.

Referring to FIG. 3, the lens MPU tests (i.e. waits) for an SS signal from the shutter mechanism unit 15 in step S125. If no SS signal is received, control returns to step S115. When an SS signal is received, steps S130, S135 and S140 are executed. In steps S130 and S135, subroutines A and B are again executed.

In step S140, the correction error computation circuit 75 reads the drive error (the newest drive error) that was stored in the drive error memory unit (A) in step S270. Following this, the maximum and minimum values of the drive error to this point are read from the drive error memory unit (B) 76. The correction error computation circuit 75 computes a new maximum value and a new minimum value from the newest drive error value and the maximum and minimum values of the drive error that have been read to this point. These new maximum and minimum values are stored in the drive error memory unit (B) 76. When step S140 is executed for the first time, preset initial values for the maximum and minimum values are referenced from the drive error memory unit (B) 76.

In step S145, the determination is made whether an AS signal has been received from the shutter mechanism unit 15. If no AS signal has been received, exposure of the photographic film is still underway, so control returns to step S130. When an AS signal is received, the exposure of the photographic film is complete and step S150 is executed.

In step S150, the correction error computation circuit 75 reads the maximum and minimum values of the drive error stored in the drive error memory unit (B) 76, finds the difference, and computes this difference as the correction error. Furthermore, in step S150, the correction lens 3 returns to a preset position in preparation for the next photograph.

In step S155, the determination circuit 63 compares the computed correction error with a preset value stored in the lens memory unit 77. When the determination circuit 63 determines the correction error exceeds the preset value, then the shake correction was inadequate and step S160 is executed. If this correction error is less than the preset value, control skips step S160 and the picture taking is complete. In step S160, a warning signal is output to the camera MPU 14. The preset value stored in the lens data memory unit 77 is a limiting value for shake correction based on the shake correction drive device 9.

The camera MPU 14 receives the warning signal and outputs a lighting start signal to the display control unit 22 that indicates, for example, a flash. The display control unit 22 receives the lighting start signal and flashes the LED 23. After a predetermined length of time, the camera MPU 14 outputs a signal to extinguish the LED 23. The display control unit 22 receives the extinguish signal and extinguishes LED 23. The photographer determines shake correction was not accomplished by viewing the range measurement frame flashed by the LED 23. It would also be within the scope of this invention to indicate a warning by displaying the range measurement frame with a display luminosity different from its normal display luminosity.

The above description explained an embodiment where an LED is used in the warning display system is merely illustrative and is not limiting. For example, the warning display can be a transmissive liquid crystal display device.

Figure 7:
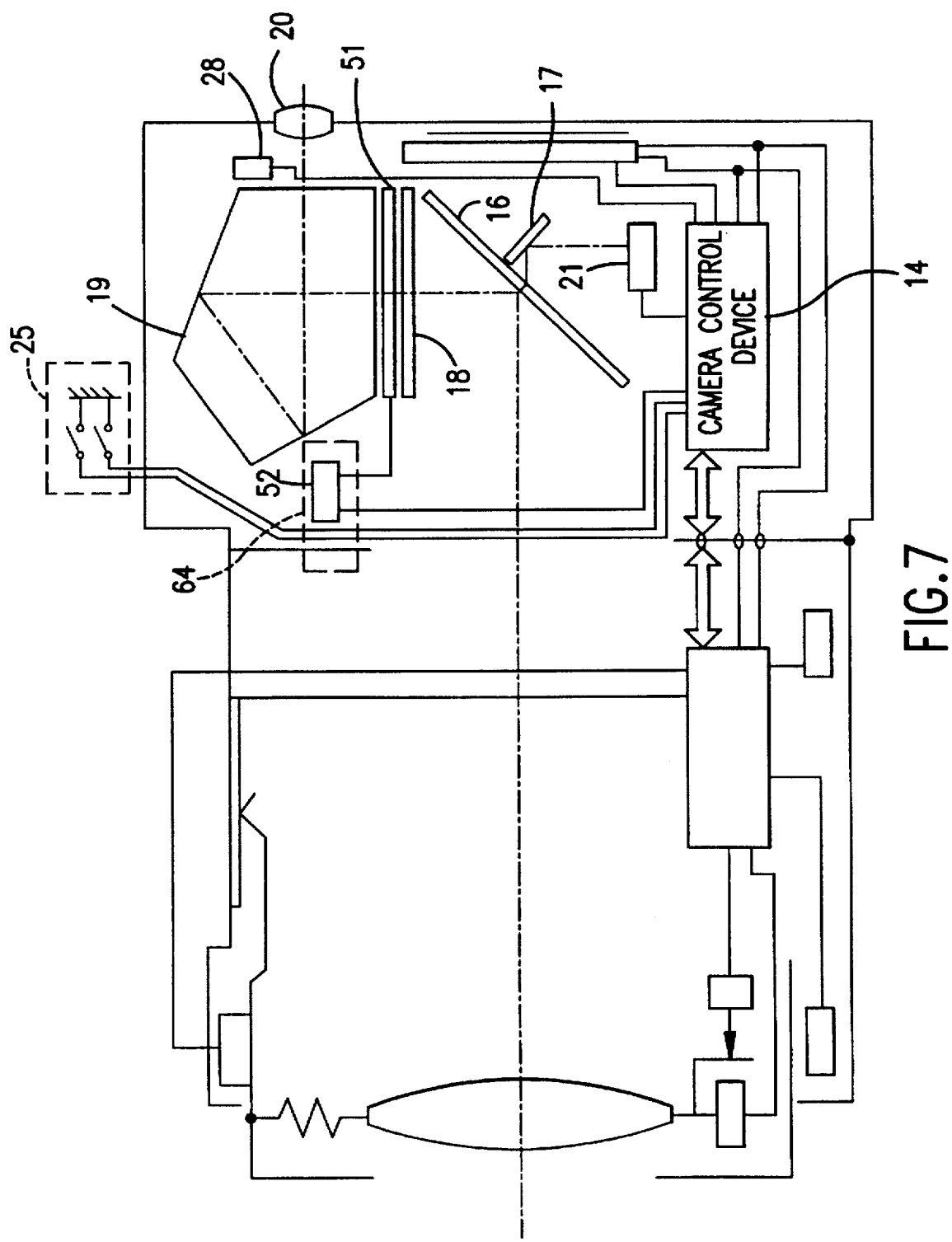
FIG. 7 is a drawing of a camera according to yet another embodiment of the present invention.

A second embodiment will now be described that uses a transmissive liquid crystal display device. FIG. 7 shows a camera equipped with a transmissive liquid crystal display device 51. In this embodiment, components are used having the same configuration as in the first embodiment, with the exception of the transmissive liquid crystal display device 51 and the display control unit 52.

Figure 13:
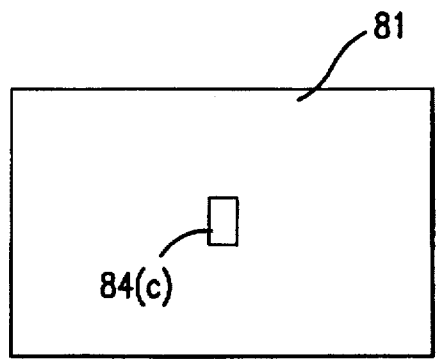
FIG. 13 is a display in the viewfinder field according to one embodiment.

The display control unit 52 is connected to the transmissive liquid crystal display device 51. The camera control device 14 is connected to the display control unit 52. A transmissive liquid crystal display device is well-known in the art. The transmissive liquid crystal display device 51 includes a range measurement frame in the region within the viewfinder field 81. The range measurement frame 84c can be displayed as shown in FIG. 13 so that the range measurement frame 84c is essentially in the center of the viewfinder field 81.

Figure 14:
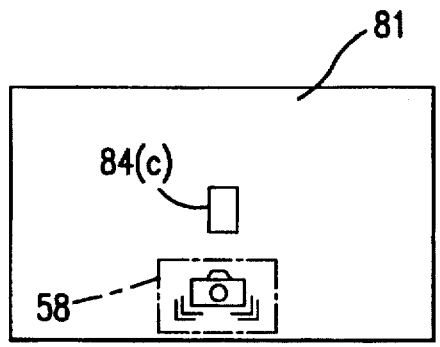
FIG. 14 is an drawing showing an icon indicating a shake warning display.

The display control unit 52 controls the transmissive liquid crystal display device 51 based on a signal from the camera control device 14 sent when shake correction is insufficient. For example, the display control unit 52 receives the shake correction warning signal from the camera MPU 14 and causes the range measurement frame 84c to flash. Similarly, if a color liquid crystal display is used, a warning is possible by causing the range measurement frame 84c to change colors. Also, as shown in FIG. 14, an icon 58 indicating a shake may be displayed as a warning for insufficient shake correction. Preferably, the photographer cannot visually confirm the icon 58 except when the shake correction warning is accomplished.

A third embodiment will now be described where the warning display is used in a camera having focus state detection in a plurality of focus state detection regions.

Figure 6:
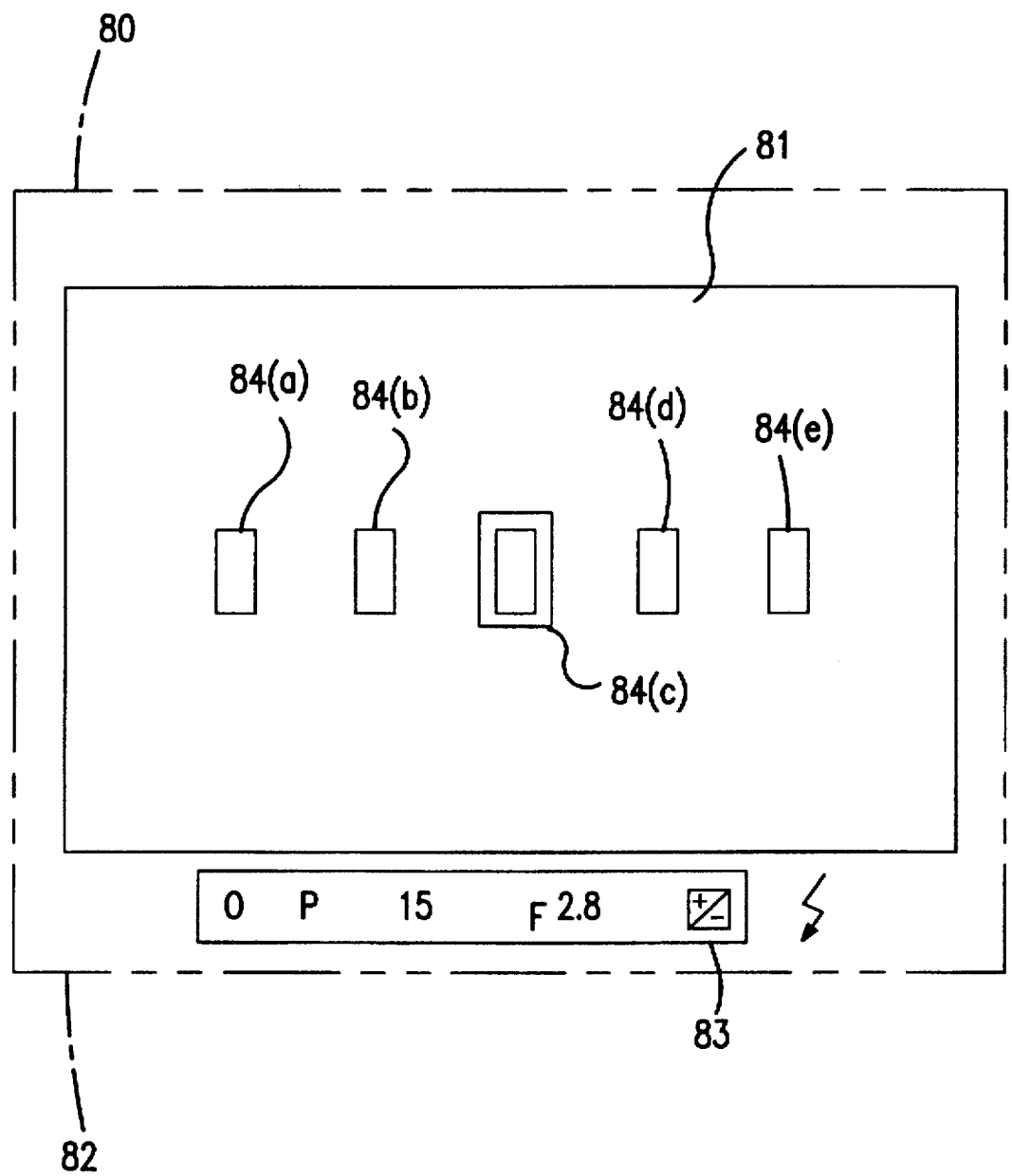
FIG. 6 is a drawing of a viewfinder display according to another embodiment of the present invention.

Most of the components used in the first embodiment can be used as components in the third embodiment. However, with the third embodiment, five focus state detection regions (not shown in FIG. 1) are provided in the focus state detection unit 21. As shown in FIG. 6, range measurement frames 84a, 84b, 84c, 84d and 84e that correspond to the various focus state detection regions are displayed in the viewfinder field 81 within the viewfinder region 80. These five focus state detection regions can be selected through operation of a region selection member (not shown) provided on the camera body 1. In addition, while only one pair of an LED 23 and a condenser lens 24 is provided in the first embodiment, this embodiment includes five such pairs to form the five corresponding range measurement frames. If a liquid crystal display device is used, as in the second embodiment, it is preferable for the configuration to be such that five range measurement frames can be displayed.

Figure 15:
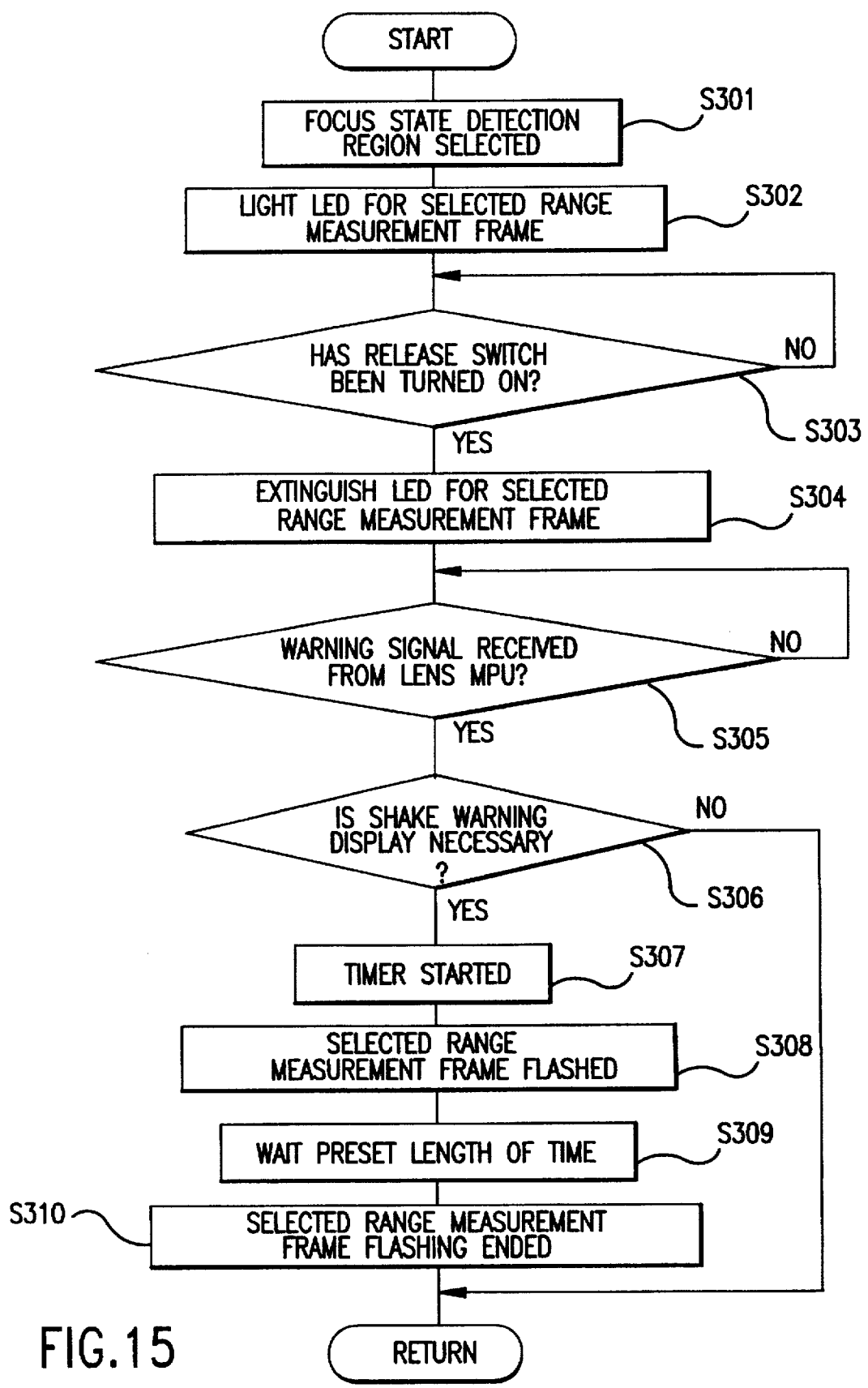
FIG. 15 is a flowchart explaining an embodiment of the present invention.
Figure 16:
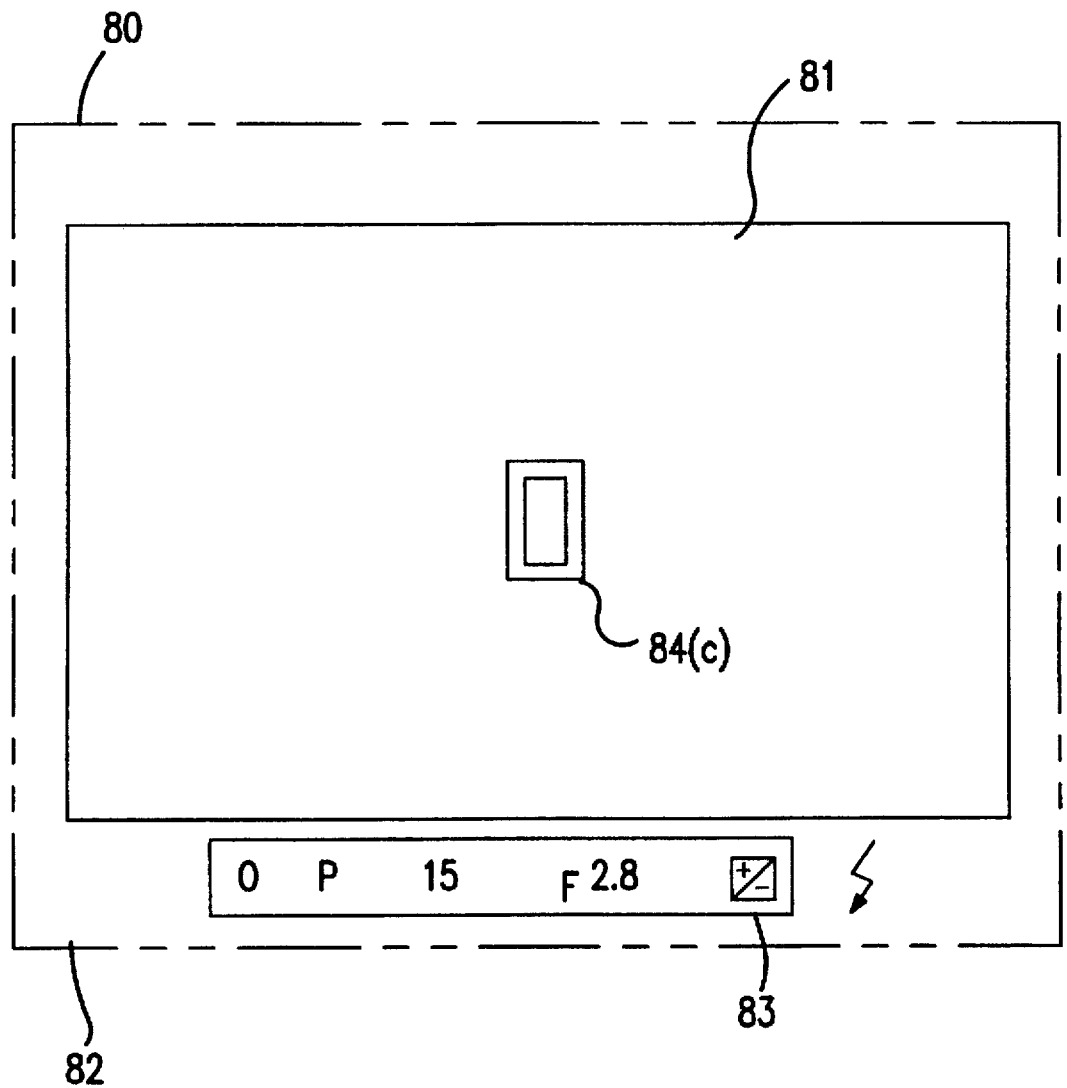
FIG. 16 is a drawing of a viewfinder display in a conventional camera.

The third embodiment is described with respect to FIGS. 1, 6 and 15. The description centers on changes in the display state of the multiple range measurement frames. An LED is used in the warning display system as in the first embodiment. In addition, the selection of the focus state detection regions are accomplished by the selection circuit in the camera MPU 14 with the necessary programs stored in the memory unit.

In FIG. 15, upon receiving a signal indicating that the half-depressed switch 26 has been turned on, the camera MPU 14 becomes capable of receiving the selection of a focus state detection region through the region selection member. In step S301, when the focus state detection region is selected by the selection member, the selection circuit sends a signal to the display control unit 22 to light the range measurement frame corresponding to the selected focus state detection region. In step S302, the display control unit 22 lights an LED based on this signal and starts light emission to the target range measurement frame. The range measurement frame 84c is lit in FIG. 6.

In step S303, the camera MPU 14 tests (i.e. waits) for a signal indicating that the release switch 27 has been turned on. When this signal is received, the MPU sends a signal to the display control unit 14 to cause the selected range measurement frame to be extinguished to execute step S304. In step S304, the display control unit 22 receives this signal and extinguishes the LED and the range measurement frame. In other words, a selected range measurement frame is lit until a signal is received that indicates the release switch 27 is on. During this interval, the exposure control and auto focus operations of the camera are accomplished.

In step S305, the camera MPU 14 tests (i.e. waits) for a warning signal from the lens MPU 12. In step S306, after a warning signal is received, the determination is made whether to conduct a shake warning display. The content of this warning signal is determined by the determination circuit 63 of the lens MPU 12 and indicates whether shake warning is necessary.

When a warning display is necessary, control continues to step S307 to start the measuring of time on a timer unit (not shown) in the camera MPU 14. In step S308, the camera MPU 14 sends a signal to the display control unit 22 to flash the range measurement frame selected in step S301 by flashing the LED corresponding to the selected range measurement frame.

In step S309, the timer unit determines a preset time has elapsed and signals the camera MPU 14. In step S310, the camera MPU 14 sends a signal to the display control unit 22 to extinguish the selected range measurement frame by extinguishing the corresponding flashing LED. As described above, other warning displays are also within the scope of this invention.

On the other hand, if a warning display is not necessary in step S306, steps S307, S308, S309 and S310 are not executed.

As explained above, the display state of the range measurement frames is such that the range measurement frame corresponding to the selected focus state detection region is lit while the corresponding focus state detection region is selected, and the selected range measurement frame flashes when a shake warning is necessary after completion of an exposure by the camera.

A fourth embodiment will now be described including a selection circuit that operates through visual line input to select from the plurality of focus state detection regions in the third embodiment.

Figure 8:
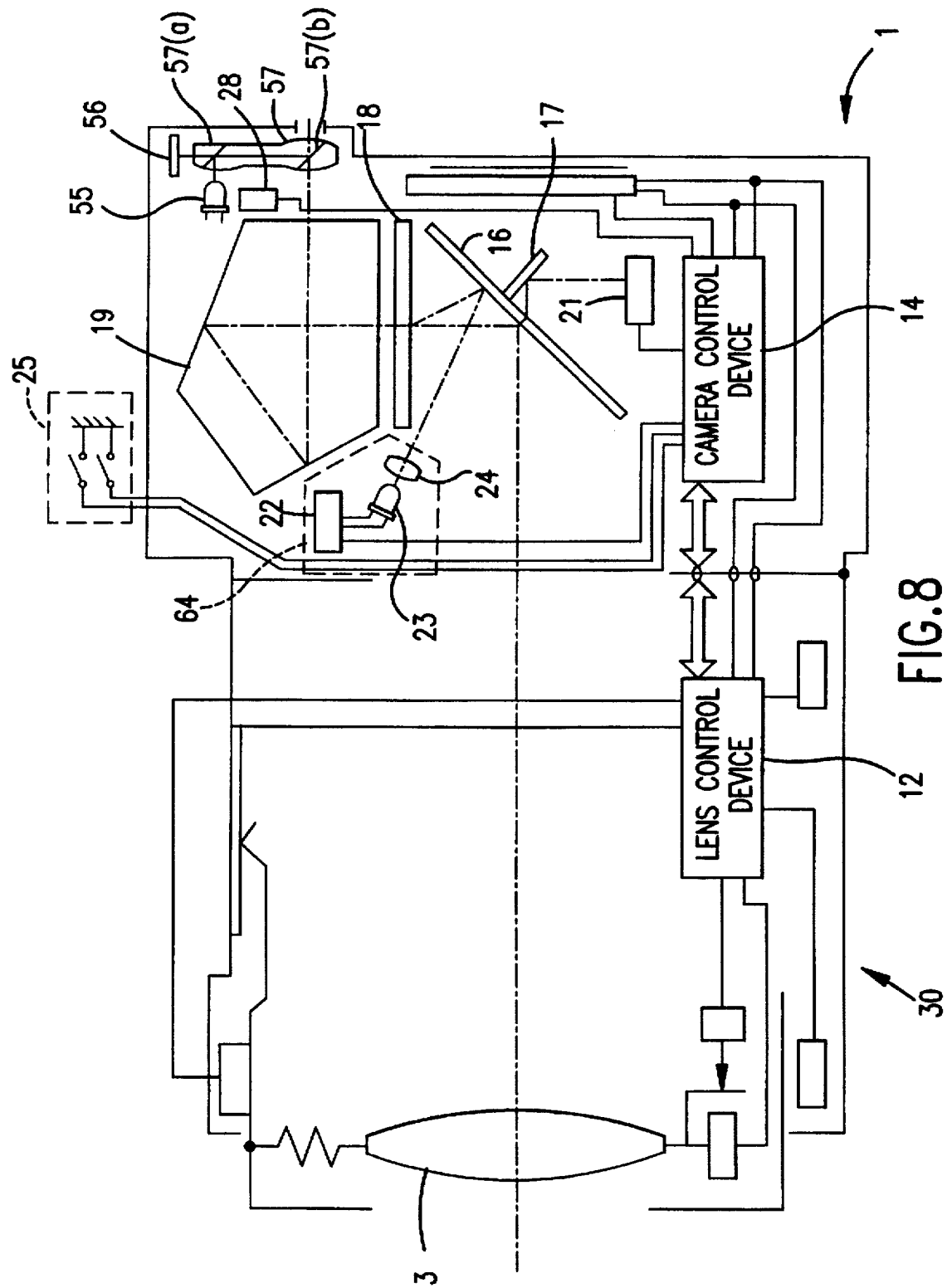
FIG. 8 is a drawing of a camera according to still yet another embodiment of the present invention.

In this embodiment, a light-emitting element 55, a visual line detection optical system 57 and a light-receiving element 56 are included inside the camera body 1 as shown in FIG. 8. Two half-silvered mirror units 57a and 57b are located with the visual line detection optical system 57. In addition, the eyepiece lens function is also achieved by the lower portion of the visual line detection optical system 57 including the half-silvered mirror unit 57b.

The light-emitting element 55 and the light-receiving element 57 are connected to the camera control device 14. As an example, LEDs can be used in the light-emitting element 55 and photoelectric conversion elements can be used in the light-receiving element 56.

Selection using visual line input will now be described. Light rays emitted from the light-emitting element 55 are reflected by half-silvered mirror unit 57a and then by half-silvered mirror unit 57b onto the eye of the photographer. The light rays reflected by the eye of the photographer are then reflected by half-silvered mirror unit 57b and pass through half-silvered mirror unit 57a. The light-receiving element 56 receives the light rays that have passed through the half-silvered mirror unit 57b and outputs the amount of change as a signal to the camera control device 14. The camera control device 14 computes the amount of rotation of the eyeball of the photographer based on this signal and detects the point of convergence of the eyes of the photographer within the viewfinder field 81. When the determination is made that the point of convergence of the eyes of the photographer selects (i.e., is within) one of the focus state detection regions, a signal is sent to the display control unit 22 causing the selected corresponding range measurement frame to be lit. Further, the display control unit 22 lights the selected range measurement frame using the corresponding LED.

With the above first, second, third and fourth embodiments, the warning display corresponds to a warning output for shake correction. However, other configurations are also possible. For example, the display may correspond to a warning output indicating poor illumination by the strobe.

As described above, because a warning display is accomplished using a range measurement frame within the viewfinder field 81, the photographer can confirm the warning display while paying primary attention to the subject. Furthermore, by using a range measurement frame for the warning display, the regions used specifically for warning displays are reduced to thereby conserve space.

In addition, in a camera equipped with a shake correction means where a warning is output when shake correction cannot be effected, the warning display can be within the viewfinder field. Accordingly, the probability is decreased that the warning display is overlooked when shake correction cannot be effected.

As many different embodiments of this invention may be made and used without departing from the spirit and scope, it is understood that the invention is not limited to the specific embodiments.

What is claimed is:

1. A camera comprising:

a viewfinder having a viewfinder field and a region outside the viewfinder field in a field of vision, the viewfinder field including a range measurement frame;

a warning device detecting a change in a condition of the camera and outputting a warning signal based on the change, wherein the warning device comprises, a detection device that detects an amount of camera shaking and outputs a shake signal representative of the amount of shaking, and a determination device receiving the shake signal and outputting the warning signal when the shaking amount exceeds a threshold level;

a warning display device receiving the warning signal and changing a display of the range measurement frame in the viewfinder field based on the warning signal.

2. The camera of claim 1, wherein the warning display device changes the range measurement frame after expose of a photographic film.

3. The camera of claim 1, wherein the warning display device is at least one of a flashing display and a colored display.

4. The camera of claim 1, further comprising a focus state detection device that detects a focus state detection region within the viewfinder field based on a visual focus of an operator, wherein the warning display device changes the display measurement frame based on the detected focus state detection region.

5. The camera of claim 1, further comprising a translucent member located between an eyepiece and a viewfinder screen, wherein the range measurement frame is formed using said translucent member by blocking incident light passing through the viewfinder screen.

6. The camera of claim 5, wherein said translucent member is a liquid crystal display device.

7. The camera of claim 5, wherein the warning display device includes an LED that transmits light into said translucent member, and the translucent member is a transparent plate having a plurality of angled cuts along one side of the plate, the angled cuts including a blocking cut that partially blocks the incident light passing through the viewfinder screen to form said range measurement frame and a reflecting cut that reflects said light transmitted by said LED.

8. The camera of claim 1, further comprising:

a focus state detection device that executes a focus state detection in one of a plurality of focus state detection regions; and a selection device that selects one of the plurality of focus state detection regions based on the focus state detection, wherein the viewfinder field includes a plurality of range measurement frames each corresponding to one of the plurality of focus state detection regions, the selection device changing the range measurement frame corresponding to the selected focus state detection region.

9. The camera of claim 8, further comprising a visual line detection device that detects a visual focus of an operator within the viewfinder field, wherein the selection device selects the focus state detection region based on the visual focus detected by the visual line detection device.

10. A camera comprising:

a viewfinder having a viewfinder field and a region outside the viewfinder field in a field of vision;

a shake amount detection device that detects an amount of shaking of a photography optical system and outputs a shake signal representative of the amount of shaking;

a correction device that receives the shake signal and moves a part of the photography optical system at least when the amount of shaking is less than a threshold level;

a determination device that receives the shake signal and outputs a warning signal when the amount of shaking exceeds the threshold level; and a warning display device that displays a warning display based on the warning signal, wherein the warning display device displays the warning display in the viewfinder field after exposure of the photographic film.

11. The camera of claim 10, wherein the warning display device changes a range measurement frame within the viewfinder field as the warning display.

12. The camera of claim 11, wherein the warning display is at least one of a flashing display and a colored display.

13. The camera of claim 11, further comprising:

a focus state detection device that executes a focus state detection in one of a plurality of focus state detection regions; and a selection device that selects one of the plurality of focus state detection regions based on the focus state detection, wherein the viewfinder field includes a plurality of range measurement frames each corresponding to one of the plurality of focus state detection regions, the warning display device changing the range measurement frame corresponding to the selected focus state detection region.

14. The camera of claim 13, further comprising a visual line detection device that detects a visual focus within the viewfinder field, wherein the selection device selects the focus state detection region based on the visual focus detected by the visual line detection device.

15. A camera comprising:

a viewfinder including a viewfinder field and a region outside the viewfinder field in a field of vision, the viewfinder field having a range measurement frame;

a drive device that moves part of a photographic optical system;

a shake amount detection device that detects an amount of shaking of a photography optical system and outputs a shake signal representative of the amount of shaking;

a correction control device that calculates and outputs a driving amount of the drive device based on the shake signal received from the shake amount detection device, the drive device receiving the driving amount and moving the part of the photography optical system based on the driving amount;

a movement amount detection device that detects an amount of movement of the part of the photography optical system and outputs a movement signal based on the amount of movement;

a correction error computation device that compares the movement signal and the driving amount and outputs a correction error signal;

a determination device that receives the correction error signal and outputs a warning signal when the correction error signal exceeds a threshold level; and a warning display device that displays a warning display in the viewfinder field based on the warning signal after exposure of photographic film.

16. The camera of claim 15, wherein the warning display device changes the range measurement frame display as the warning display.

17. The camera of claim 15, further comprising:

a focus state detection device that executes a focus state detection in one of a plurality of focus state detection regions; and a selection device that selects one of the plurality of focus state detection regions based on the focus state detection, wherein the viewfinder field includes a plurality of range measurement frames each corresponding to one of the plurality of focus state detection regions, the selection device changing the range measurement frame corresponding to the selected focus state detection region.

18. The camera of claim 17, further comprising a visual line detection device that detects a visual focus within the viewfinder field, wherein the selection device selects the focus state detection region based on the visual focus detected by the visual line detection device.

19. The camera of claim 15, wherein the warning display is an icon in the viewfinder field.

* * * * *